Walter M. Donnell
Charles A. Grantom
INVENTORS

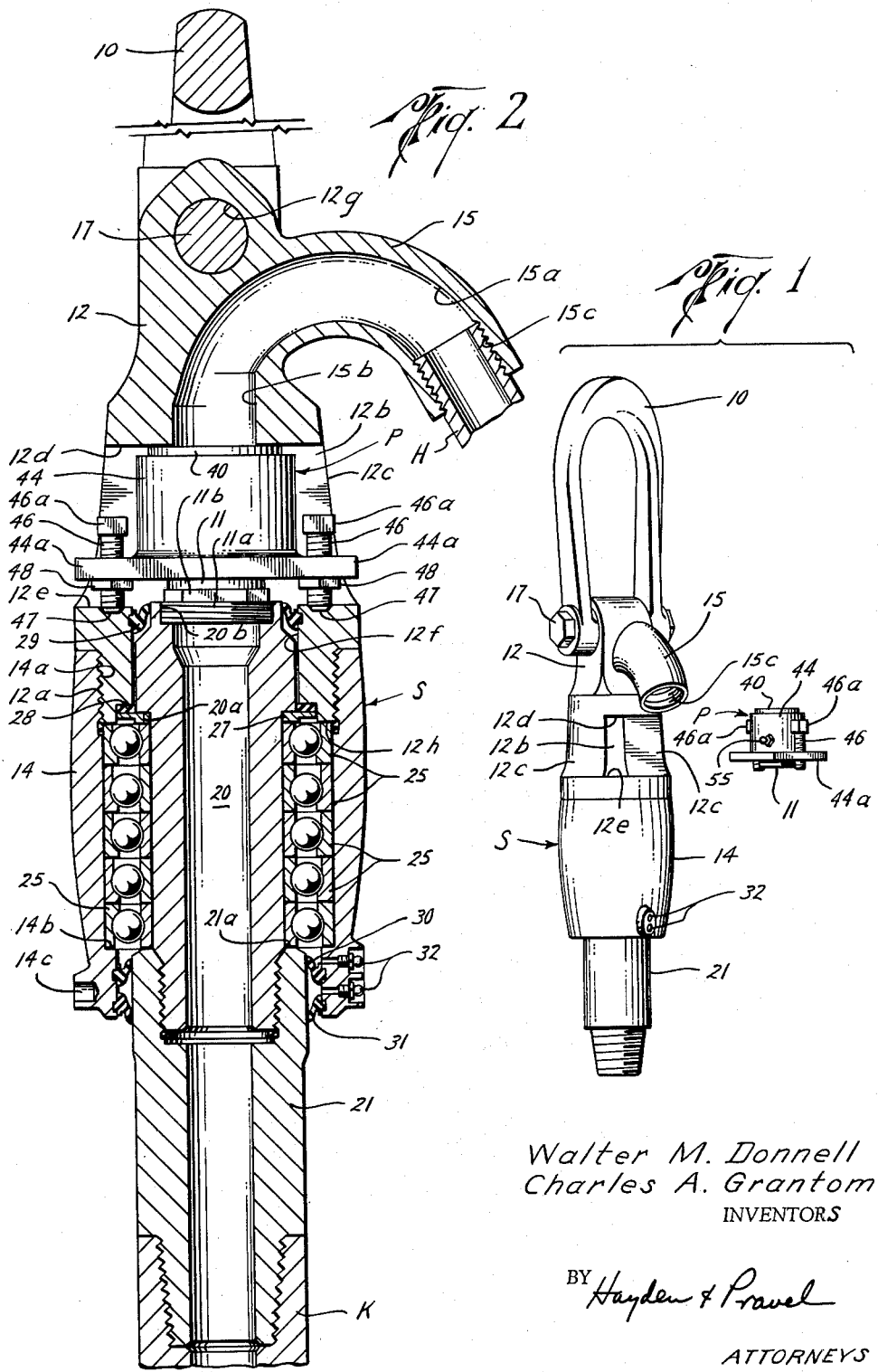

BY Hayden & Pravel

ATTORNEYS

United States Patent Office 2,981,557
Patented Apr. 25, 1961

2,981,557

SWIVEL PIPE COUPLING HAVING A LATERALLY REMOVABLE PACKING ASSEMBLY

Walter M. Donnell and Charles A. Grantom, Houston, Tex., assignors to Mary May King, Houston, Tex.

Filed Feb. 25, 1957, Ser. No. 641,908

2 Claims. (Cl. 285—32)

This invention relates to swivels, and particularly to swivels which are connected with a rotatable well pipe and with a stationary well fluid hose to permit the transmission of well fluid through the swivel to the well pipe while such pipe is rotating but without requiring the rotation of the hose therewith.

An object of this invention is to provide a new and improved compact streamlined swivel wherein the packing assembly for sealing between the rotatable and stationary parts is readily removable from the swivel for replacement or repair to thereby decrease shut-down time in well operations.

An important object of this invention is to provide a new and improved swivel having a packing assembly with a wash pipe internally thereof, wherein said packing assembly and wash pipe are laterally removable from the rest of the swivel without loosening or disconnecting any of the other parts of the swivel from each other, whereby the packing assembly and wash pipe are readily removable and replaceable.

Another object of this invention is to provide a new and improved swivel wherein a laterally removable packing assembly is provided which has means therewith for adjusting the packing to obtain an effective seal between the rotatable and stationary parts, whereby the packing in the packing assembly may be adjusted to compensate for wear during use to thereby increase the useful service life of the assembly prior to removal thereof from the rest of the swivel for the replacement of the packing.

A particular object of this invention is to provide a new and improved swivel having a stationary gooseneck and bearing housing mounted with a rotatable spindle, wherein a packing assembly and wash pipe are mounted in the swivel so that the wash pipe is normally rotatable with the bearing spindle relative to the packing assembly, gooseneck and bearing housing, and wherein said wash pipe is separable from said bearing spindle by holding said wash pipe stationary with said gooseneck as said spindle is rotated to thereby release the wash pipe for removal from the rest of the swivel upon a removal of the packing assembly therefrom.

A further object of this invention is to provide a new and improved swivel wherein a packing assembly and wash pipe are adapted to be connected to the swivel at one end only of the packing assembly and the wash pipe so that minor misalignment of the packing assembly and wash pipe with the opening through the swivel does not interfere with proper sealing action by the packing assembly.

Still another object of this invention is to provide a new and improved swivel having a packing assembly which is readily removable from the rest of the swivel in the field by commonly used tools, whereby the use of special tools is avoided.

A still further object of this invention is to provide a new and improved swivel wherein a laterally removable packing assembly and wash pipe are mounted in a lateral opening in the swivel, and wherein the wash pipe is of a length less than the height of said lateral opening to permit removal thereof laterally through said lateral opening, but said wash pipe having a releasable connection with a bearing spindle in the swivel during normal use to thereby provide a positive mounting for the wash pipe and the packing assembly during such normal use.

Another object of this invention is to provide a new and improved swivel wherein a packing assembly and wash pipe therewith are removable from the rest of the swivel without requiring a loosening or dis-connection of any threads which are normally subjected to the load of the drill pipe, whereby galling of such threads is prevented.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an elevation of the swivel of this invention, with the packing assembly thereof shown removed from the rest of the swivel;

Fig. 2 is a vertical sectional view illustrating the construction of the swivel of this invention in detail;

Figure 3:
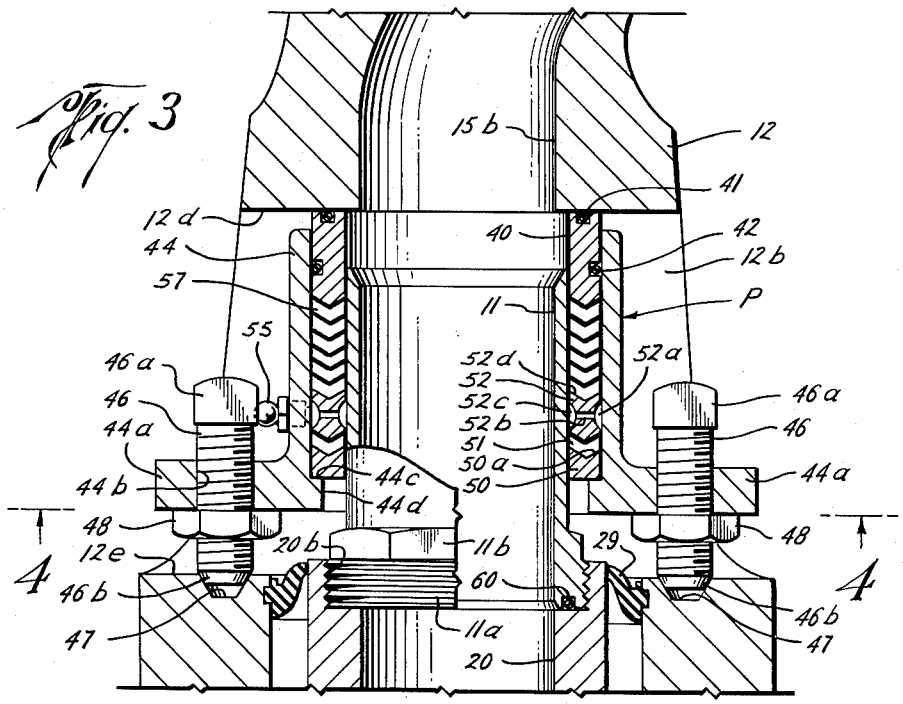
Fig. 3 is a view, partly in section and partly in elevation, illustrating the packing assembly and the wash pipe construction of this invention, such view being enlarged as compared to Fig. 2.

In the drawings, the letter S designates generally the swivel of this invention which has a bail 10 therewith for supporting the swivel S from a cable in a well derrick in the known manner. The lower end of the swivel S is connected with a kelly K (Fig. 2) which has the well pipe connected therebelow. A hose H of well known construction is connected with the swivel S, as will be more fully described hereinafter, for directing drilling mud or fluid through the swivel to the kelly K and the well pipe therebelow for normal drilling operations. As will be explained, the mounting of the upper end of the kelly K with the swivel S permits the admission of the drilling mud or fluid to the well pipe while the well pipe is being rotated, but without imparting any rotation to the drilling mud or fluid hose H so that such hose H is not twisted as the well pipe is rotated. With this particular invention, a packing assembly P and a wash pipe 11 (Fig. 3) therewith are mounted for preventing leakage of the drilling mud or fluid from the interior of the swivel during the rotation of the well pipe, and such packing assembly P and wash pipe 11 are so constructed so that they are removable laterally from the rest of the swivel S without requiring any disconnecting or loosening of any of the other parts of the swivel. Such removal of the packing assembly P and the wash pipe 11 can readily be accomplished in the field without requiring special tools, and therefore, the packing assembly P readily lends itself to replacement and repair in the field. Additionally, the packing assembly P is adjustable, as will be more fully explained, so that as the packing wears during use the effectiveness of the sealing action by the packing may be increased.

Considering the construction of the swivel S in detail, such swivel S has a gooseneck 12 and a bearing housing 14 which are connected together to form what may be termed the body of the swivel S. Preferably, the connection of the gooseneck 12 with the bearing housing 14 is made by the engagement of external threads 12a on the gooseneck 12 with internal threads 14a on the bearing housing 14. However it will be appreciated that other means for connecting the gooseneck 12 with the bearing housing 14 may be utilized.

The gooseneck 12 derives its name primarily from the fact it has therewith a curved tube or pipe 15 which is shaped somewhat like the neck of a goose. The curved tube or pipe 15 has an internal bore or fluid passage 15a which merges with, and terminates in, a substantially longitudinal passage 15b within the main portion of the gooseneck 12. At the outer extremity of the curved pipe or tube 15, the internal bore or passage 15a is provided with internal threads 15c for connecting the hose H with the gooseneck 12. It will be understood, of course, that other means for connecting the hose H to the gooseneck 12 can be employed so long as the drilling mud or fluid from the hose H is directed through the swivel S.

At the lower end of the fluid passage 15b, the gooseneck 12 is provided with a laterally extending window 12b, which preferably extends entirely through the gooseneck 12 (Fig. 1) with longitudinally extending portions 12c of the gooseneck 12 on each side of the opening 12b. The upper wall 12d of the opening 12b extends laterally below the lower end of the fluid passage 15b. The lower wall 12e of the opening 12b also extends laterally, and preferably substantially parallel to the upper wall 12d. The portion of the gooseneck 12 below the lower wall 12e is formed with a central axial or longitudinal opening 12f therethrough, for a purpose to be hereinafter fully explained.

As previously mentioned, the entire swivel S is supported in a derrick or other similar structure (not shown) by engaging the bail 10 with the usual hook on an elevator (not shown) suspended from a cable in the derrick. Such bail 10 is pivotally connected with the gooseneck 12 by means of a pivot bolt 17 which extends through a suitable opening 12g near the upper end of the gooseneck 12. By so locating the bail 10 near the upper end of the gooseneck 12, the overall streamlining of the swivel S is facilitated, and additionally, the bail 10 is removed from the central area of the swivel S in which the packing assembly P is located so that such bail 10 does not interfere with the removal of the packing assembly P.

A bearing spindle 20 is mounted in the bearing housing 14 and such spindle 20 extends upwardly into the axial or longitudinal opening 12f in the gooseneck 12. The bearing spindle 20 is connected with a tubular connector or adaptor 21 therebelow, and such adaptor 21 is connected to the kelly K so that the bearing spindle 20 is connected to the kelly K and the well pipe therebelow. Thus, when rotation is imparted to the kelly K and the well pipe therebelow, the bearing spindle 20 and the connector or adaptor 21 are also rotated. To facilitate the rotation of the bearing spindle 20 relative to the bearing housing 14, and to reduce the friction therebetween, a plurality of bearings 25 are provided in the embodiment of this invention illustrated in the drawings. The upper four bearings 25 serve to take the thrust in a downward direction on the bearing spindle 20 whereas the lower bearing 25 serves to take the upward thrust on the bearing spindle 20. However, it will be appreciated that various types of bearings and a varying number of the bearings can be utilized depending upon the particular conditions encountered in normal use.

The bearings 25 are confined between the lower annular surface 12h at the lower end of the gooseneck 12 and an internal annular surface 14b near the lower end of the bearing housing 14. The connector or adaptor 21 has an annular end or shoulder 21a which also engages the lowermost bearing 25. A bearing shield 27 which is in the form of a ring is located at the upper end of the bearings 25 and is confined below an upwardly extending annular shoulder 20a on the spindle 20. A seal ring 28 formed of rubber or other resilient sealing material is confined immediately above the bearing shield 27. Also, in order to keep lubricant within the bearing housing for lubricating the bearings 25, and also to keep fluid from entering the bearing housing, resilient seals are provided above and below the bearings 25, so that the annular resilient rubber seal ring 29 which is formed of rubber or any other resilient material is in constant sealing engagement with the external surface of the bearing spindle 20. At the lower end of the bearing housing 14, a pair of annular seal rings 30 and 31 which are formed of rubber or other resilient material are disposed in contact with the external surface of the connector 21. Lubricant is introduced into the bearing housing 14 for lubrication of the bearings 25 through grease fittings 32 which may be of any standard type. Also, it should be noted the bearing housing 14 is provided with recesses 14c for receiving a special bar to tighten the housing 14 on the gooseneck 12 in the initial assembly, but in field use, and more particular in the replacement of the packing assembly P, the special bar is not necessary because it is unnecessary to loosen or disconnect the threads 12a and 14a. Therefore, the danger of galling the threads 12a and 14a is avoided with the particular construction of this invention.

Figure 4:
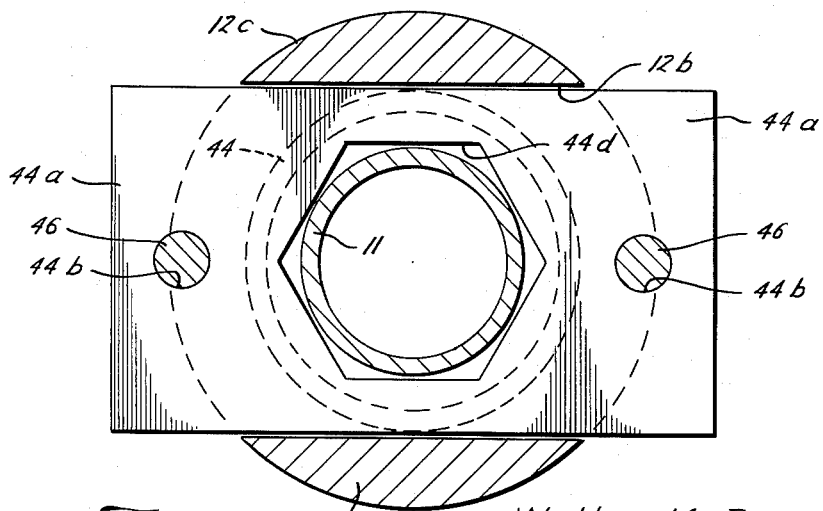
Fig. 4 is a view taken on line 4—4 of Fig. 3.

The packing assembly P is shown in detail in the position in which it is normally used in Figs. 3 and 4. The packing assembly P includes an annular packing gland 40 which is preferably formed of a relatively rigid material such as metal. The packing gland 40 has an annular seal ring 41 therewith which is formed of rubber or other resilient material for sealing engagement with the upper wall 12d of the laterally extending opening 12b. The packing gland 40 also has another annular seal ring 42 therewith which is formed of rubber or other resilient material for sealing with the internal surface of annular stuffing box 44. The stuffing box 44 is provided with laterally extending flanges 44a which together form a substantially rectangular base (Fig. 4), the sides of which contact the side walls of the lateral window 12b so as to prevent rotational movement of the stuffing box 44 relative to the gooseneck 12 when the stuffing box 44 is in its normal position for use (Figs. 3 and 4). The flanges 44a are threaded at 44b with internal threads for receiving a plurality of set screws 46. In the usual case, there are two set screws 46, but it will be appreciated that more or less of such set screws may be employed within the skill of the art. The upper ends or heads 46a of the screws 46 are square or otherwise shaped for receiving the normal types of wrenches available at field operations, so that special tools are not required. The lower end 46b of each screw 46a preferably fits within a notch or recess 47 formed in the lower wall 12e of the laterally extending window 12b. With the lower ends 46b of the screws 46 in the recesses 47, the stuffing box 44 is moved longitudinally by rotating such set screws 46. When the desired position for the stuffing box 44 is reached, as will be more fully explained hereinafter, lock nuts 48 are threaded upwardly to engage the lower surface of the laterally extending flanges 44a to thereby prevent further rotation of the set screws 46 until such nuts 48 are released.

The stuffing box 44 is provided with an internal annular shoulder or seat 44c, upon which is seated a packing seat ring 50 formed of metal or other relative rigid material. The upper surface 50a of the packing seat ring 50 is preferably notched or grooved to receive at least one annular ring of packing 51, which packing is preferably of the "Chevron" type. A lantern ring 52 for receiving and distributing lubricant to the packing is positioned above the layer of packing 51. A conventional grease or lubricant fitting 55 such as a "Zerk" fitting is provided for the injection of lubricant so as to distribute same from the external annular recess 52a through suitable lateral openings 52b to the internal annular recess 52c. The upper surface 52d of the lantern ring 52 is preferably notched or grooved to receive a plurality of layers of packing 57. The packing 57 is preferably of the "Chevron" type so that it is resilient and provides a fluid-tight seal with the external surface of the wash pipe 11 relative thereto. The effectiveness of the seal provided by the packing 57 is increased by threading the set screws downwardly relative to the stuffing box 44, because such downward movement of the set screws 46 imparts an upward movement to the stuffing box 44. Thus, with the packing gland 40 in contact with the upper wall 12d, the upward movement of the stuffing box 44 tends to expand or move the packing 57 into firmer sealing contact with the inside surface of the stuffing box 44, the outside surface of the wash pipe 11, and the lower end of the packing gland 40, whereby fluid leakage around the wash pipe 11 is prevented. Also, as the packing 57 wears during use due to the rotation of the wash pipe 11 relative to the packing gland 57, the set screws 46 may be turned downwardly relative to the stuffing box 44 to increase the sealing action provided by the packing 57. Such adjustment of the packing 57 may be accomplished at the well site due to the fact that it can be carried out with the types of wrenches which are commonly used at a well and in other similar operations.

The wash pipe 11 has a plurality of threads 11a formed on the external surface at its lower end for threaded engagement with internal threads 20b formed at the upper end of the bearing spindle 20. A fluid tight seal is provided between the wash pipe 11 and the bearing spindle by an annular seal ring 60 which is formed of rubber or other resilient sealing material. Thus, the wash pipe 11 and the bearing spindle 20 are releasably connected together for rotation together under normal use. By reason of the connection of the wash pipe 11 with the bearing spindle 20, the packing assembly P is prevented from shifting laterally in the lateral window 12b of the gooseneck 12, and, in fact, the connection provided by the threads 11a and 20b is the only connection that is provided for preventing the lateral shifting of the packing assembly P except for the minor benefit provided by the engagement of the ends 46b of the screws 46 in the recesses 47. It will be observed that the upper end of the packing assembly P is not connected to the gooseneck 12 or any other part of the swivel S, but it is in sealing contact with the surface 12d so that although a fluid seal is provided, there is no connection of the packing assembly P at its upper end to the rest of the swivel. For that reason, even if the wash pipe 11 is slightly out of longitudinal alignment with the substantially longitudinal passage 15b and the bore of the bearing spindle 20, the packing assembly will still function properly and fluid such as the drilling mud can still flow from the hose H through the swivel S without leakage therefrom.

The wash pipe 11 extends upwardly so that it projects above the lower end of the packing gland 40 to confine the packing 57 and to thereby prevent extrusion of the packing 57. The wash pipe 11 is, however, of a length which is less than the distance from the upper wall 12d to the lower wall 12b so that when the wash pipe 11 is disconnected from the bearing spindle 20, it can be removed laterally with the packing assembly P from the rest of the swivel S.

In order to disconnect the wash pipe 11 from the bearing spindle 20 without requiring special tools, the packing stuffing box 44 is provided with flat surfaces or wrench surfaces 44d (Figs. 3 and 4) which are normally spaced above corresponding flat surfaces or nut surfaces 11b formed on the external surfaces of the wash pipe 11 above threads 11a. Therefore, the wash pipe 11 is free to rotate with the bearing spindle 20 relative to the stuffing box 44 under normal conditions, but when it is desired to release the wash pipe 11, the stuffing box 44 is lowered so that the flat wrench surfaces 44d are positioned adjacent to the surfaces 11b on the wash pipe 11. Such lowering of the stuffing box 44 is accomplished by first unthreading lock nuts 48 and then turning the set screws 46 in an upward direction relative to the stuffing box 44.

The stuffing box 44 is thus lowered so that the wrench surfaces 44d slide down and become positioned around the nut surfaces 11b in a manner similar to a wrench fitting about a nut. In any event, the stuffing box 44 is locked with the wash pipe 11 to prevent relative rotation therebetween and since the stuffing box 44 has the laterally extending flanges 44a which engage with the side walls of the lateral window 12b, the stuffing box 44 is prevented from turning or rotating relative to the gooseneck 12 and therefore the wash pipe 11 is held stationary with the gooseneck 12 when the surfaces 44d and 11b are engaged. With the wash pipe 11 held in such a stationary position, the bearing spindle 20 is rotated by rotating the kelly K so that the bearing spindle 20 turns relative to the wash pipe 11. Such relative rotation of the bearing spindle 20 with respect to the wash pipe 11 causes the threads 20b and 11a to become unthreaded or disengaged and therefore causes the wash pipe 11 to travel upwardly to a released position. Preferably the threads 11a and 20b are left hand threads so that when it is desired to release the wash pipe 11 from the bearing spindle 20, the rotation of the kelly K must be in an opposite direction to that normally used for drilling operations. Thus, it is evident that the use of left hand threads 11a and 20b is desirable because it prevents the inadvertent release of the wash pipe 11 from the bearing spindle 20 during normal drilling operations. However, it will be appreciated that right hand threads could be employed for the threads 11a and 20b if such safety factor was not considered necessary. When the wash pipe 11 has been released from the bearing spindle 20, it is then readily removed with the packing assembly P from the rest of the swivel S because the wash pipe 11 is of a length which is less than the height of the lateral window 12b.

The operation or use of the swivel S of this invention is believed evident from the foregoing description. As previously pointed out, the packing assembly P is positioned as shown in Figs. 2–4 during normal use so that the drilling mud or fluid flows from the hose H through the curved pipe or tube 15, the interior of the wash pipe 11, the bore of the bearing spindle 20, the bore of the connector or adaptor 21, and finally down through the bore of the kelly K and the well pipe therebelow for use in the normal drilling operations. With a cable or the like supporting the swivel S in a well derrick in the usual manner, the kelly K is rotated to impart rotation to the well pipe therebelow (not shown). Such rotation of the kelly K and the well pipe therebelow imparts a rotation to the connector or adaptor 21 and the bearing spindle 20. Since the wash pipe 11 is connected with the bearing spindle 20, it rotates with such spindle 20 and therefore there is a relative rotation between the wash pipe 11 and the packing assembly P. The packing assembly P is prevented from rotating by reason of the contact of its flanges 44a with the side walls of the laterally extending window or opening 12b. As can be seen in Fig. 3 particularly, the wrench flats or surfaces 44d are spaced above the nut flats or surfaces 11b on the wash pipe 11 during the normal use of the swivel S so that the wash pipe 11 is free to rotate relative to the stuffing box 44. The packing 57 is intially adjusted by adjusting the set screw or screws 46 to apply the desired amount of pressure to such packing 57 for obtaining effective sealing action with the wash pipe 11, whereby fluid leakage around the wash pipe 11 is thereby prevented.

When it is desired to remove the packing assembly P from the rest of the swivel S, the lock nuts 48 are loosened and then the set screws 46 are turned in the direction to cause the stuffing box 44 to move downwardly with respect to such screws 46. The screws 46 are rotated until the wrench flats or surfaces 44d are in contact with the nut flats or surfaces 11b on the wash pipe 11. It will be appreciated that as such stuffing box 44 is lowered, the packing assembly is no longer confined against longitudinal movement in the opening 12b because the packing gland 40 is permitted to move downwardly away from the contact with the upper wall 12d. Thereafter, with the wrench flats or surfaces 44d in contact with the nut flats or surfaces 11b, rotation is imparted to the bearing spindle 20 in such a direction that the threads 20b are disengaged from the threads 11a. As previously pointed out, it is preferable to provide left hand threads 11a and 20b, and in such case, the kelly K would be rotated in a direction which is opposite to the normal direction for drilling operations. Therefore with left hand threads 11a and 20b, an inadvertent unthreading or release of such threads would be prevented because normal rotation for drilling would tend to tighten such threads and maintain the connection of the wash pipe 11 with the bearing spindle 20.

In any event, after the threads 20b and 11a are released by the rotation of the bearing spindle 20 relative to the rest of the swivel S, the wash pipe 11 is in a raised position and it can be readily removed laterally from the gooseneck 12 through the laterally extending window 12b. When the window 12b is open on both sides, the packing P and the wash pipe 11 may be removed from either side of the window 12b and, of course, the packing assembly P and the wash pipe 11 would be removed laterally together. Fig. 1 illustrates the external appearance of the swivel S with the packing assembly P and the wash pipe 11 removed therefrom. The main packing 57 and the lower packing 51 may then be readily replaced or repaired or an entirely new packing assembly P may be inserted in the place of the packing assembly P which has been removed from the swivel S. Such removal and replacement of the packing assembly P and the wash pipe 11 may be accomplished with the common types of wrenches which are available in the field, and particularly in connection with oil field operations. It will be understood that after the packaging assembly P is repositioned in the laterally extending window 12b, the set screws 46 are turned so as to cause the stuffing box 44 to travel upwardly to position the wrench flats 44d above the nut flats or surfaces 11b. Thereafter, the bearing spindle 20 is rotated, preferably by rotating the kelly so that the threads 11a and 20b are again engaged to form a tight connection therebetween. The set screws 46 are adjusted to obtain effective sealing action with the packing gland 40 and the packings 57 and 51. The lock nuts 48 are then tightened as previously explained, and the swivel S is again ready for use. The ease and speed with which the packing assembly P and the wash pipe 11 may be assembled and disassembled with respect to the rest of the swivel S is thus believed evident.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A swivel, comprising a gooseneck with a fluid passage therethrough, a bearing housing connected to said gooseneck, a bearing spindle also having a fluid passage therethrough and being mounted in said bearing housing for rotation relative to said housing and said gooseneck, a packing assembly having an opening therethrough, said gooseneck having a laterally extending window therein separating the adjacent ends of said fluid passages, means for releasably retaining said packing assembly in said lateral window with said opening in said packing assembly in alignment with the fluid passages in said gooseneck and said bearing spindle, said means for releasably retaining said packing assembly including a wash pipe positioned in said opening of said packing assembly, releasable means rigidly and sealingly connecting one end of said wash pipe to said bearing spindle, a stuffing box longitudinally movable relative to said gooseneck and said wash pipe, means on said stuffing box engageable with the walls of said laterally extending window in said gooseneck to prevent relative rotation between said stuffing box and said gooseneck, and co-acting means on said stuffing box and said wash pipe for locking said wash pipe to said stuffing box and thereby to said gooseneck to hold said wash pipe against rotation upon a rotation of said bearing spindle relative thereto for effecting a disconnection of said connection means whereby said packing assembly and wash pipe are removable from the rest of the swivel.

2. A swivel, comprising a gooseneck with a fluid passage therethrough, a bearing housing connected to said gooseneck, a bearing spindle also having a fluid passage therethrough and being mounted in said bearing housing for rotation relative to said housing and said gooseneck, a packing assembly having an opening therethrough, said gooseneck having a laterally extending window therein separating the adjacent ends of said fluid passages, means for releasably retaining said packing assembly in said lateral window with said opening in said packing assembly in alignment with the fluid passages in said gooseneck and said bearing spindle, said packing assembly including an annular packing gland engageable with an intermediate portion of a flat wall of said lateral window adjacent to and surrounding one end of the fluid passage through said gooseneck for forming a fluid seal at said one end of said fluid passage through said gooseneck, an annular stuffing box having an annular packing therein and being longitudinally adjustable relative to said packing gland, a wash pipe fixed to said bearing spindle and extending within said stuffing box and of a length to be removed through said window, and means co-acting with said stuffing box and engageable with the wall of said lateral window adjacent to one end of the fluid passage in said bearing spindle for urging said packing into sealing contact with said packing gland.

References Cited in the file of this patent

UNITED STATES PATENTS

| | | |
|---|---|---|
| 1,292,060 | Richard | Jan. 21, 1919 |
| 1,478,097 | Black | Dec. 18, 1923 |
| 1,596,144 | Black | Aug. 17, 1926 |
| 1,819,417 | Holmgreen | Aug. 18, 1931 |
| 1,996,795 | Dodge | Apr. 9, 1935 |
| 2,237,715 | Shaw et al. | Apr. 8, 1941 |
| 2,394,800 | Murphy | Feb. 12, 1946 |
| 2,459,472 | Tremolada | Jan. 18, 1949 |
| 2,501,680 | King | Mar. 28, 1950 |
| 2,590,512 | Crain | Mar. 25, 1952 |
| 2,590,688 | Crain | Mar. 25, 1952 |
| 2,764,428 | Murphy | Sept. 25, 1956 |
| 2,782,057 | Moore | Feb. 19, 1957 |
| 2,867,453 | Watts | Jan. 6, 1959 |

FOREIGN PATENTS

| | | |
|---|---|---|
| 862,370 | France | Nov. 30, 1940 |
| 805,470 | Germany | May 21, 1951 |
| 689,932 | Great Britain | Apr. 8, 1953 |